US006641146B2

(12) United States Patent
Reese

(10) Patent No.: US 6,641,146 B2
(45) Date of Patent: Nov. 4, 2003

(54) CREEPER WITH AN ELEVATED PLATFORM

(76) Inventor: Roger R. Reese, 7904 Weedsport/Sennett Rd., Weedsport, NY (US) 13166

(*) Notice: Subject to any disclaimer, the term of this patent is extended or adjusted under 35 U.S.C. 154(b) by 0 days.

(21) Appl. No.: 09/994,159

(22) Filed: Nov. 26, 2001

(65) Prior Publication Data

US 2003/0098559 A1 May 29, 2003

(51) Int. Cl.[7] .......... B62B 11/00; E06C 7/16
(52) U.S. Cl. .......... 280/32.6; 182/116
(58) Field of Search .......... 280/32.5, 32.6, 280/640, 47.18, 639, 47.41; 182/116

(56) References Cited

U.S. PATENT DOCUMENTS

| | | | | | |
|---|---|---|---|---|---|
| 2,701,168 | A | * | 2/1955 | Schemers | 280/32.6 |
| 2,969,123 | A | * | 1/1961 | Jamerson et al. | 280/32.6 |
| 2,974,809 | A | * | 3/1961 | Sellars et al. | 280/32.6 |
| 3,737,007 | A | | 6/1973 | Herrell | 182/210 |
| 4,397,374 | A | * | 8/1983 | Rumage et al. | 280/32.6 |
| D271,717 | S | | 12/1983 | Linn | |
| 4,542,806 | A | * | 9/1985 | Olson | 280/32.6 |
| 4,715,573 | A | * | 12/1987 | Liegel | 280/32.6 |
| 4,863,178 | A | * | 9/1989 | Friesen | 280/32.6 |
| 4,895,380 | A | | 1/1990 | Brooks et al. | 280/32.6 |
| 5,076,448 | A | * | 12/1991 | Ballard | 212/261 |
| 5,100,283 | A | * | 3/1992 | Carty | 414/590 |
| 5,451,068 | A | * | 9/1995 | Shockley | 280/32.6 |
| 5,460,392 | A | | 10/1995 | Hansen | 280/32.6 |
| 5,857,683 | A | | 1/1999 | Auel | 280/32.6 |
| 5,899,297 | A | * | 5/1999 | Clark | 280/32.5 |
| 5,934,490 | A | * | 8/1999 | Mora | 212/176 |
| 5,947,489 | A | | 9/1999 | Tucker | 280/32.6 |
| 6,059,298 | A | | 5/2000 | Tucker | 280/32.6 |
| 6,095,532 | A | | 8/2000 | Martin | 280/32.6 |
| 6,105,719 | A | * | 8/2000 | Lensing | 280/32.5 |
| 6,199,877 | B1 | | 3/2001 | Shockley | 280/32.6 |

OTHER PUBLICATIONS

Professional Tool Equipment News; 3 pages.
STTS Truck Equipmetn & Trailer Sales; 3 pages.
The Tool Warehouse, 4 pages.
Northern Tool & Equipment Co.; 3 pages.
Lincoln Automotive Mobile Engine Crane—2 Ton; 1 page.
2 Ton Folding Engine Crane—Owners Manual; 5 pages.

* cited by examiner

*Primary Examiner*—Brian L. Johnson
*Assistant Examiner*—Jeffrey J. Restifo
(74) *Attorney, Agent, or Firm*—Brown & Michaels, PC

(57) ABSTRACT

A creeper has a base originally used for an engine hoist. The base has wheels for easy mobility. The base in its original form may look like an A-shape when viewed from above. Alternatively, the base is modified to accommodate a tilt front end vehicle like a tractor trailer truck. The height adjuster is an extendable/retractable device such as a hydraulic cylinder. A support beam connects the base to a platform. A vertical arm support, which is preferably metal, keeps the height adjuster in proper alignment for the range of movement of the platform. The platform has a frame. Although the frame can be any number of pieces, it is two pieces in this embodiment. The two pieces include a body section and a chest board section connected by a pivot plate. The entire platform can be folded down for easy storage. Each section is preferably padded with a body pad and a chest pad, respectively. There are preferably three platform pivot points: a first pivot point which attaches the platform to the support beam, a second pivot point where the height adjuster is mounted, and a third pivot point between the chest board and the body board.

19 Claims, 16 Drawing Sheets

CREEPER WITH AN ELEVATED PLATFORM

BACKGROUND OF THE INVENTION

1. Field of the Invention

The invention pertains to the field of creepers. More particularly, the invention pertains to a creeper with an elevated platform, that allows users to work safely in an elevated position over an automobile, for example, above the engine compartment under the hood of a truck.

2. Description of Related Art

Mechanics face various obstacles when working on a vehicle. The obstacles are even more numerous when working on larger vehicles, such as trucks. One such obstacle is reaching the engine and all of the necessary parts of that engine.

There have been numerous patents that attempted to solve the problem of reaching all the necessary components of the engine. However, the most of the creepers are designed for under vehicle access only, limiting the reach-ability of the mechanic. For example, U.S. Pat. No. 6,199,877, "TRANSFORMABLE MECHANIC'S CREEPER", Shockley (2001), discloses a transformable mechanics creeper having at least two pivotal connections, a base assembly, and an extendable roller frame. U.S. Pat. No. 6,095,532, "FOLDING CREEPER", Martin (2000) teaches a creeper that has telescopic braces or extensions and is designed for folding. This creeper has only two positions: both are under vehicle access positions. U.S. Pat. Nos. 5,947,489 and 6,059,298 "FOLDABLE CREEPER", Tucker (2000), show a foldable creeper having caster wheels and two rectangular platform sections with padded cushions. U.S. Pat. No. 4,895,380, "ADJUSTABLE VARIABLE SLOPE ELEVATING CREEPER", Brooks et al. (1990), shows an improved adjustable variable slope elevating creeper including a mobile horizontal frame, a platform for supporting a reclining person, a device for lifting one or both ends of the platform by a control operable by the reclining person, and a hydraulic jack. U.S. Pat. No. 5,857,683, "CREEPER HAVING LEVER ARMS PROVIDING VARIABLE MECHANICAL ADVANTAGE FOR INCLINING A BACK PORTION", Auel (1999), discloses a creeper having lever arms and an inclinable back portion. These creepers are all designed for under vehicle access only.

An obstacle faced by mechanics working on larger vehicles is obtaining the correct positioning over the engine. There have been patents issued in the past to try and solve this problem, but there remains a problem with adjustment. U.S. Pat. No. D271,717, "ELEVATED CREEPER FOR AUTOMOTIVE MECHANICS", Linn (1983), discloses an ornamental design for an elevated creeper for automotive mechanics. Flexing and adjustability are potential problems for this design. U.S. Pat. No. 3,737,007, "ADJUSTABLE SCAFFOLD", Harrell (1973), discloses an adjustable scaffold with a movable ladder section and a base with a fixed ladder portion. The base does not fit under a truck, and it is far too tall for automotive or truck use U.S. Pat. No. 5,460,392, "HEIGHT ADJUSTABLE UNIVERSAL CREEPER APPARATUS," Hansen (1995) teaches a height adjustable creeper comprised of a movable base, interchangeable posts, extension members, a cushioned platform mounted upon a frame which is mounted upon the extension members and having rungs. The adjustment of this creeper depends upon how far apart the holes are on the upright support. The top rung is fixed to the bottom upright support. As the platform is raised, access becomes more difficult. The padded mechanic's platform overextends the base which maximizes the flexing of the mast and may create dangerous tipping if too much weight is put over the end. This unit has to be disassembled for storage. In this invention, the adjustability of the creeper is solely dependent upon how far apart the holes are on the upright support. Furthermore, the padded section of the mechanics platform is flat and stays flat through the entire range of motion, making it difficult for the mechanic to get off the creeper at a high elevation. The flat creeper bed also limits the accessibility to the work area. Lastly, the creeper is not convenient in that it has to be disassembled to be stored, and therefore reassembled each time the mechanic wants to use the creeper.

All of the prior art elevated mechanic's creepers are single use products and some have to be disassembled for storage between uses. Therefore, there is a need in the art for an adjustable height platform with multiple uses, which is easily converted for storage.

SUMMARY OF THE INVENTION

A conversion kit for converting a "cherry picker" to an elevated platform creeper. The elevated platform creeper is used for purposes such as: working on pickup trucks, medium duty trucks, tractor trailers, and other large vehicles. The elevated platform creeper has a base with legs and wheels, a mast, a platform, and a height adjuster. The platform has two sections, chest and body, which are connected to one another by a pivot capable of securing various positions.

Preferably, the mast has multiple steps fixedly attached to allow the mechanic access to the platform. Additionally, the elevated platform creeper can also fold for storage.

DETAILED DESCRIPTION OF THE INVENTION

Figure 1:
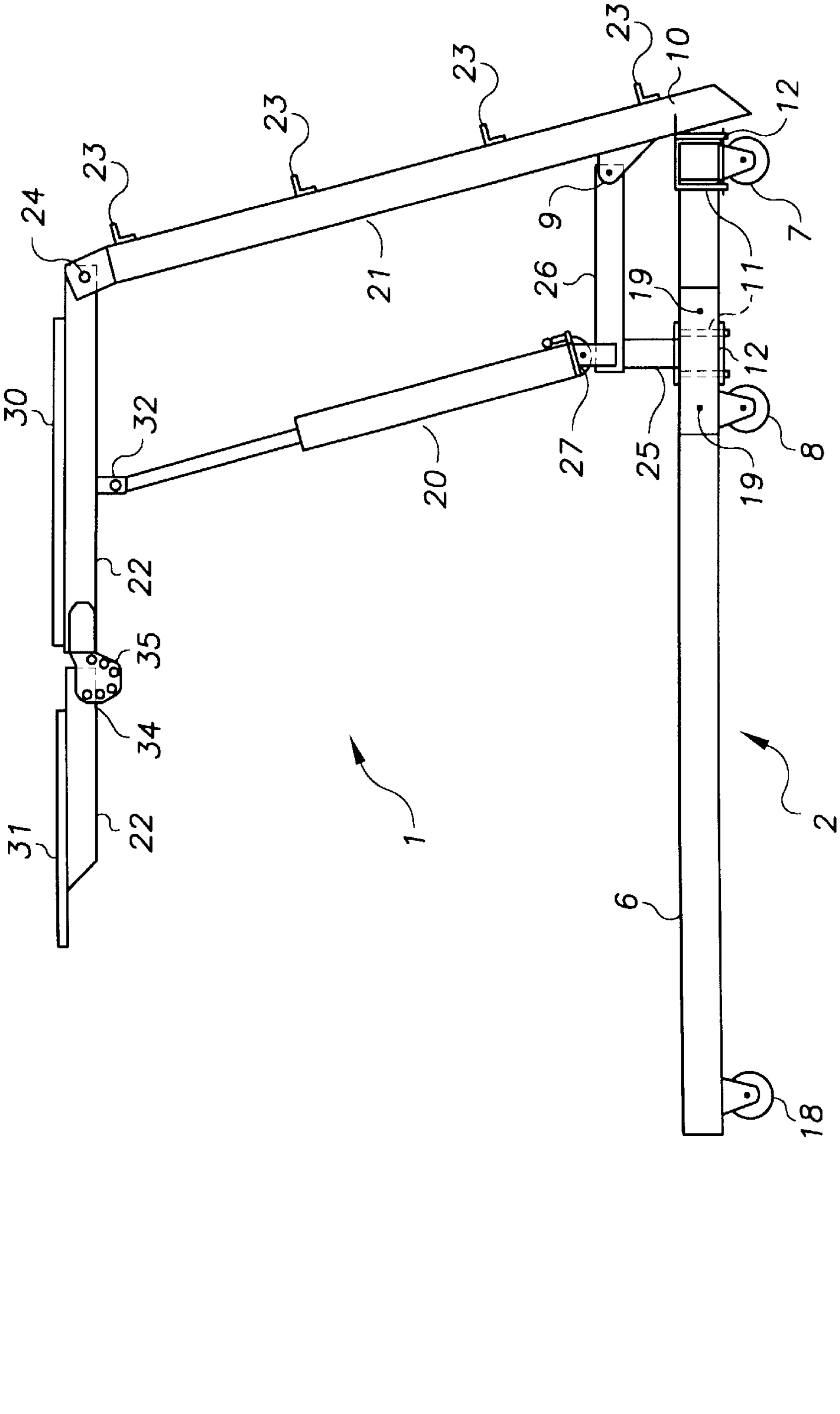
FIG. 1 shows a side view of the creeper in a preferred embodiment of the invention.
Figure 3:
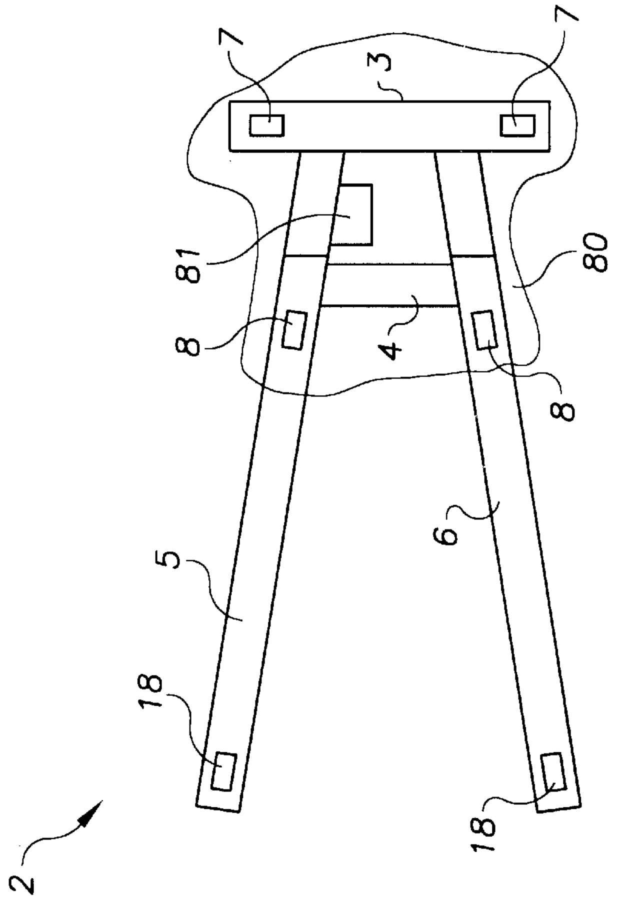
FIG. 3 shows a bottom view of the base of the creeper in a preferred embodiment of the invention.
Figure 2:
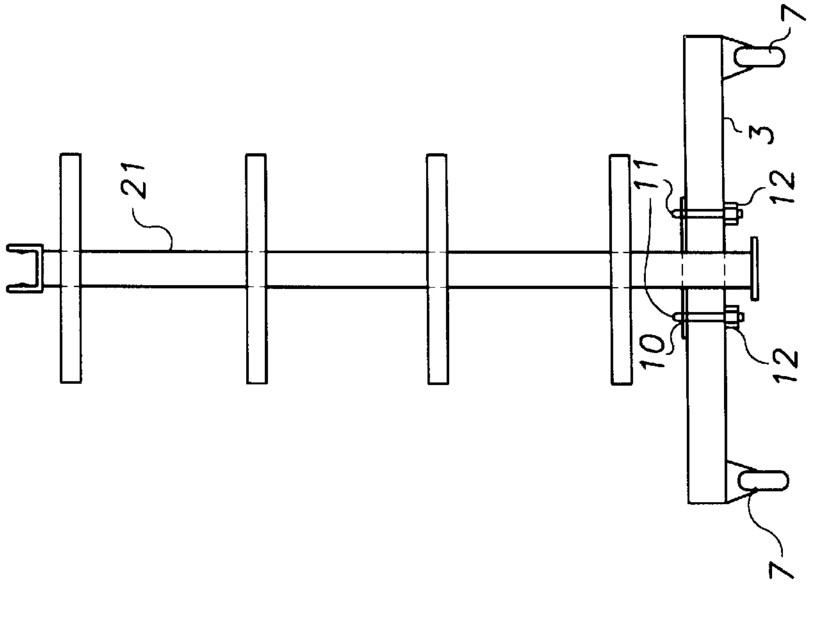
FIG. 2 shows a back view of the creeper in a preferred embodiment of the invention.
Figure 4B:
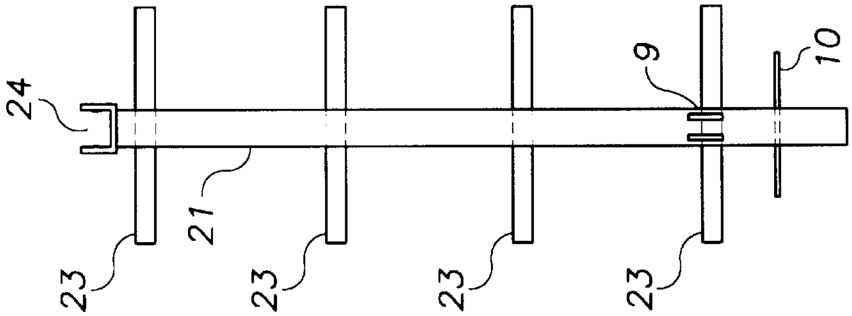
FIG. 4B shows a front view of the mast with steps, the placement of the arm mount that is used to connect a horizontal support arm, and the placement of the u-bolt clamp plate to mount the base to the mast in a preferred embodiment of the invention.
Figure 4A:
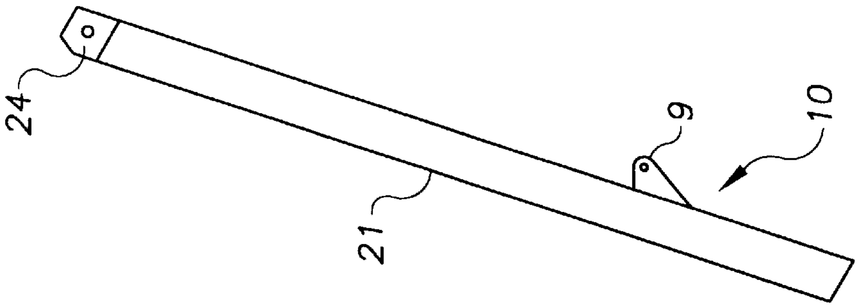
FIG. 4A shows a side view of the mast with an arm mount and u-bolt clamp plate added in a preferred embodiment of the invention.
Figure 6A:
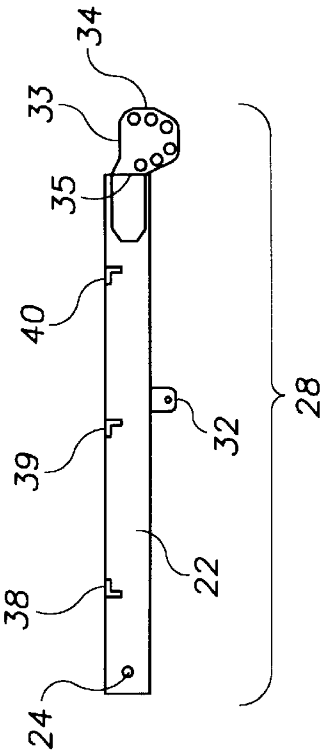
FIG. 6A shows a side view of the body section with support arms and the pivot connection that is found between the body section and the chest section in a preferred embodiment of the invention.
Figure 6B:
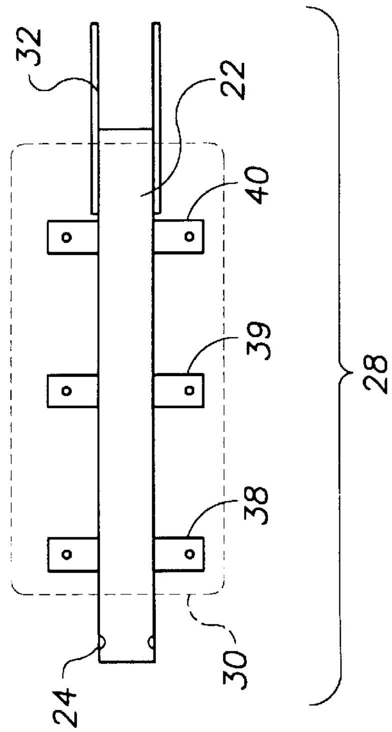
FIG. 6B shows a top view of the body section with the dotted line as the padded part in a preferred embodiment of the invention.
Figure 5:
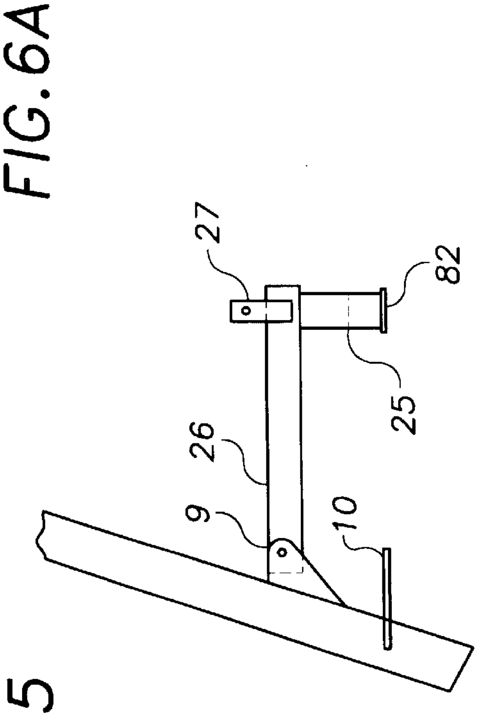
FIG. 5 shows a side view of the arm mount fixed to the mast and connected to the vertical support arm with the vertical support arm having a pivot connection for the height adjuster in a preferred embodiment of the invention.

A creeper with an elevated platform saves money and space by adding usefulness to new or existing shop equipment. The present invention is preferably sold in combination with or as an add-on conversion for the very popular engine hoist commonly known as a "cherry picker" (see FIG. 20) or sold individually with its own base if the engine hoist is not needed. A user works at new heights in a secure and comfortable position over engines for tune-ups, removal of heads and intake manifolds or any hard-to-reach job. The novel features of the present invention include a two-part adjustable bed support for more comfort and easy access to the work area. An adjustable support of the bed, for example a hydraulic cylinder, is used for easy height adjustment through its full range of movement. The device is cost effective because it has interchangeable parts with an engine crane. It also saves shop floor space because it is two pieces of equipment in one. A user lies face down on the creeper to work over truck engines or other vehicles.

The invention has a split platform pad for more comfort through a total range of height adjustment. For example, when a user is in the level or prone position, the chest pad portion is elevated to support the chest and neck to eliminate neck and shoulder fatigue. When a user is in the raised elevated position, the chest pad is lowered to a level or more comfortable position for easier accessibility to whatever the user is working on. The creeper is especially useful for a mechanic. The creeper is preferably used to repair pickup trucks, medium duty trucks, tractor trailer trucks, boats, farm equipment, farm tractors, buses, planes, construction equipment like payloaders and backhoes, off-road equipment, or cranes.

Referring to FIGS. 1–5 and FIG. 20, the creeper (1) has a base (2) originally used for an engine hoist. The base (2) preferably has six wheels (7), (8) and (18) for easy mobility. The base includes leg members (3), (4), (5), and (6), which approximate an A-shape when viewed from above. Wheels (7), (8) and (18) are preferably 3" steel wheels. In an alternative embodiment, rear wheels (7) and front wheels (18) are 4.10×4.00-8" air filled tires, while middle wheels (8) are 2½" steel wheels. In this embodiment, the creeper (1) is able to roll over rough terrain.

The rear wheels (7) are attached close to each end of back support (3). The middle wheels (8) are found on the back of leg members (5) and (6), while the front wheels (18) are found on the front of leg members (5) and (6). The base (2) is preferably manufactured so that section (80) is made up of a single, welded piece. Fasteners (19), preferably bolts, attach leg members (5) and (6) to the welded section (80). A brake (81) may be added to the creeper (1) as an optional attachment. This brake (81) stabilizes the creeper (1) during use. For example, the brake may have a spring in it, which is compressed when the creeper (1) is moving. When the creeper (1) is no longer moving, a piston goes down, and stabilizes the creeper (1). Alternatively, an air brake (81) could be used when an air line is added to the creeper (1). In another embodiment, one of the rear wheels (7) could be replaced with a lock and caster wheel to create a brake. Leg members (5) and (6) fold up for easy storage. In an alternative embodiment, leg members (5) and (6) swing in and outward for more accessibility in positioning the elevated platform around tires or other obstacles.

In an alternative embodiment, a screw handle rear stabilizer is preferably found in front of each of the rear wheels (7). A cable is found within leg members (5) and (6). Cable rollers aid in the movement of the cable during use. In this embodiment, a star wheel is located within leg members (5) and (6) directly in front of middle wheels (8) to apply front stabilizers. Additional stabilizer arms and pads are found directly behind the front wheels (18). A coil spring holds the front stabilizer in the up position.

In a preferred embodiment, back support (3) is composed of a 2¾" high×2¾ wide×31½" inch long square tube. Leg members (5) and (6) are each composed of a 2¾" high×2¾" wide×61" long square tube. Middle support (4) is composed of a 2¾"×2¾" wide square tube. There are preferably 7½" between the bottom of rear wheels (7) and the top of back support (3).

The base (2) is well established with a popular engine hoist design. In a preferred embodiment, an existing mobile base that folds up the long front legs for easy storage is utilized.

A height adjuster (20) allows the creeper (1) to be adjustable from approximately 32" to 72" with the level prone position at 50". The height adjuster (20) is preferably a hydraulic cylinder. The height adjuster (20) works very well to adjust the height of the creeper when working on large full size pickup trucks, providing a comfortable position for the user. The ease of adjusting the height adjuster (20) also gives the user the option on working on anything larger. In a preferred embodiment, an 8-ton long ram hydraulic jack is utilized. The 8-ton long ram hydraulic jack is the unit of choice because of its popularity with the engine hoist that is already in use in the industry. Another type of hydraulic cylinder, a trailer tongue screw type jack, a large screw type adjustable link, or a steel cable on a hand crank system are examples of some alternative ways the height may be adjusted.

The mast (21) is a support beam that connects the base (2) to the platform (22). The mast (21) is preferably a single steel tube that separates the base (2) from the platform (22). The mast (21) preferably incorporates steps (23) to get to the platform (22). The mast (21) also incorporates a mast platform connector, which is a pivot connection (24), for the platform (22) to move up and down in its arc or range of motion.

The mast (21) has to support much of the weight from the platform (22) as well as the user with a safety factor built in. For example, if the platform (22) weight is 50 lbs. and the user's weight is 250 lbs., the mast (21) should be made strong enough to support approximately 600 lbs. or more. The creeper (1) is preferably rated at 300 lbs. on top of the platform (22) at full extension. The safety margin is preferably 100% at 600 lbs. The mast (21) also incorporates a step system with steps (23) so a user can climb up to the platform (21). Each step (23) is preferably composed of 16"×1¾"×⅛" angle iron.

The top of the mast (21) has a mast platform connector, which is a pivot connection (24), where the platform (22) pivots up and down through its range of motion. There is preferably 44½" from the top of the base (2) to the mast platform connector (24). This mast platform connector (24) requires accurate hole placement in the platform (22) and mast (21) as well as a good fit to limit any side to side movement. This gives a comfortable and secure feel to the user on top of the platform (22) at all levels. The top step (23) is preferably 50" off the ground. The mast platform connector (24) is preferably 3" from the top step (23). Each step (23) going down from the top step is 12½" apart. The distance between the bottom step (23) and back support (3) is preferably 5". In a preferred embodiment, the mast (21) is composed of a 2¾" square tubing, which is 50" long to the mast platform connector (24). The mast (21) is similar to the mast (21) of an engine hoist, but the mast (21) is rotated 180 degrees from its use as an engine hoist. The steps (23) are added on and the u-bolt mast-base plate (10) is welded on 5" up from the ground and 5½" below the center of the arm mount (9).

A vertical support arm (25) keeps the height adjuster (20) in proper alignment for the range of movement of the platform (22). The vertical support arm (25) is designed within the limits of the base (2) in size and supports the weight from the platform (22) and a user on the platform (22) with an ample safety margin in conjunction with the mast (21). The vertical support arm (25) has a horizontal support arm (26) that connects to the mast (21) at the arm mount (9). This adds strength to the mast (21) and stability to both the vertical support arm (25) and the mast (21). The vertical support arm (25) is positioned to put the height adjuster (20) at the proper angle to allow it to work well through its range of movement. Movement is achieved through the height adjuster vertical support arm connector, a pivot connection, (27) located on top of the vertical support arm (25). The piece containing the height adjuster vertical support arm connector (27) is preferably 3½×1½"×3⁄16". There is a ⅝" hole ½" down from the top and center of this piece. There is also a foot plate (82), which is 6½"×3"×3⁄16" at the bottom of the vertical support arm (25). The height of the vertical support arm (25) between the base (2) and the horizontal support arm (26) is preferably 4½". The horizontal support arm (26) is preferably made of 2" square steel and is preferably 15" long. The vertical support arm (25) and the horizontal support arm (26) are each preferably composed of a 2" square steel tube. The bottom end of the straight 2" square steel tubing for the vertical support arm (25) connects to the back support (3) in the center with direct alignment to the mast (21) with its horizontal support arm (26). The vertical arm support (25) is preferably made with a 2" square steel tube or other structural steel.

Figure 17:
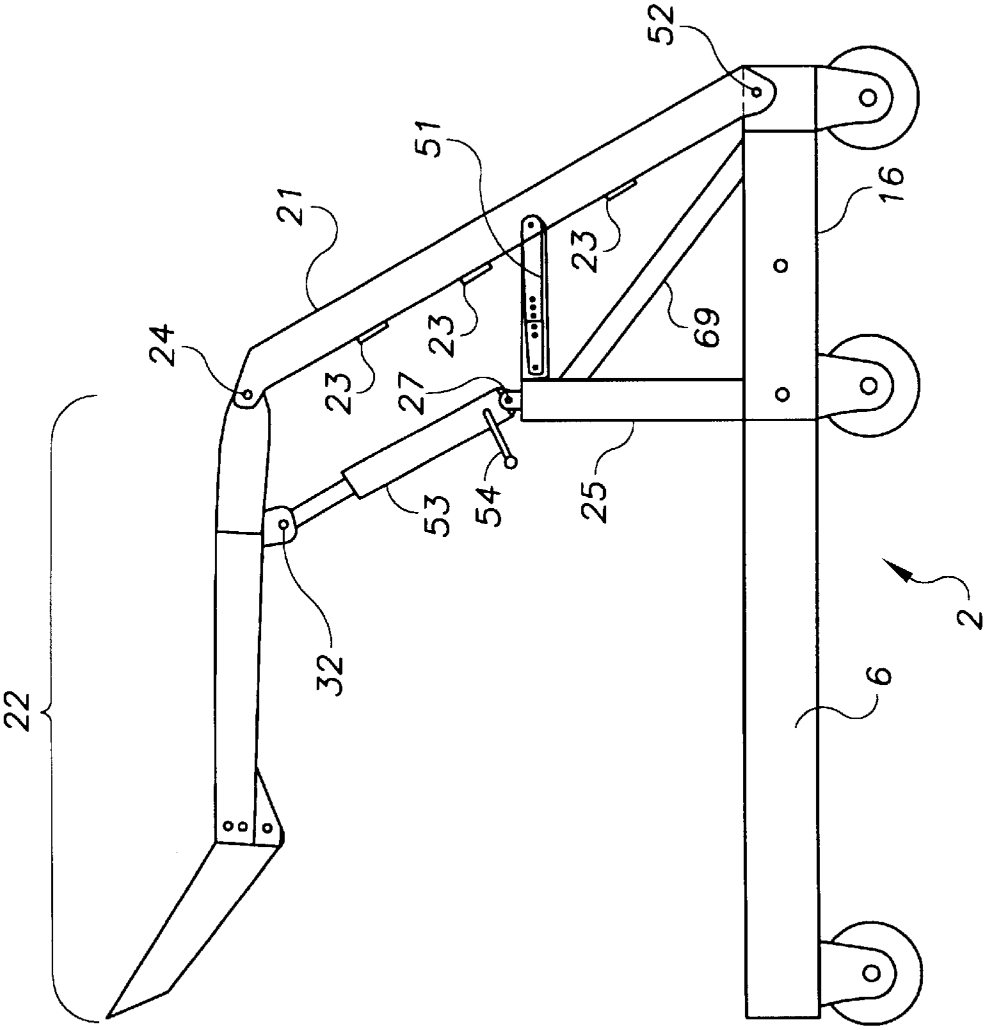
FIG. 17 shows a side view of the creeper in an alternative embodiment of the invention.

Referring also to FIG. 17, in an alternative embodiment, the horizontal support arm (26) can be replaced by an adjustable link (51) or a hydraulic cylinder (not shown) to connect the mast (21) to the vertical arm support (25) for more adjustability. In this embodiment, an additional mast pivot point (52) connects the mast (21) to the base (2). A brace (69) is also preferably included to provide support to the vertical arm support (25). The height adjuster (20) is replaced with a screw jack (53) to provide range of movement for the platform (22). A crank (54) allows a user to move the screw jack (53) into its desired position. This embodiment makes the invention more compatible with a wide range of different engine hoists.

Figure 7C:
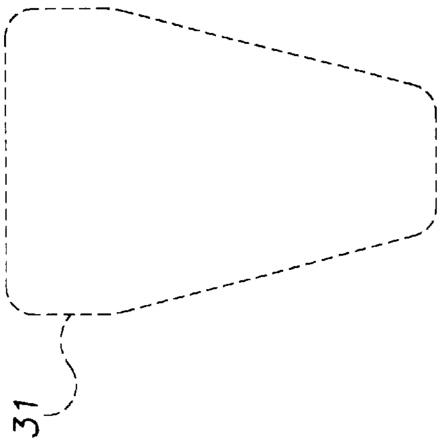
FIG. 7C shows the chest pad that attaches to the chest section shown in FIG. 7B.
Figure 7A:
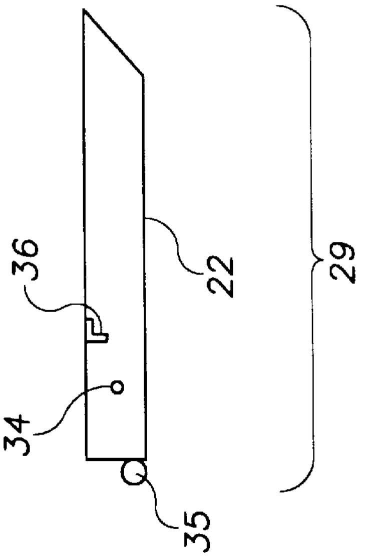
FIG. 7A shows a side view of the pivoting chest section.
Figure 7B:
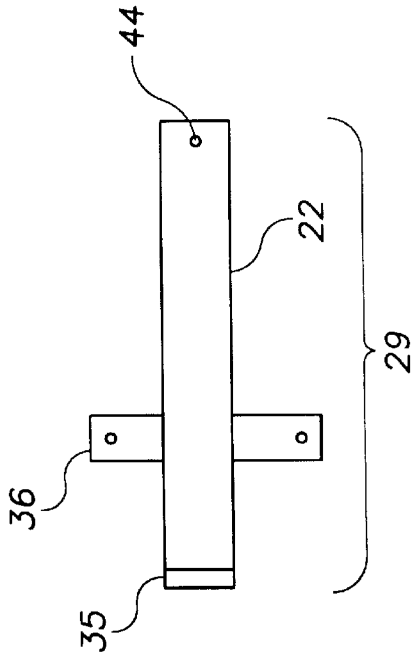
FIG. 7B shows a top view of the chest section shown in FIG. 7A.

Referring also to FIGS. 6A, 6B, 7A, 7B and 7C, the platform (22) preferably has a 2-piece frame, comprising a body section (28) (FIGS. 6A and 6B) and a chest section (29) (FIGS. 7A–7C). The sections are preferably padded with a body pad (30) and a chest pad (31), respectively. The chest pad (31) preferably extends farther forward than the platform (22). The body section (28) supports most of the body weight from a user on top of the body pad (30). The chest section (29) pivots in five positions for maximum comfort and accessibility to the work area. These positions are flat, two positions down and two positions up. Although only five positions are described here, additional positions are possible. This adjustable platform (22) increases a user's accessibility, comfort and productivity through the whole range of movement. In an alternative embodiment, the chest pad (31) includes a screw device for adjustability. The entire platform (22) can be folded down for easy storage.

There are preferably three platform pivot connections. The first pivot connection is the mast platform connector (24), which is a pivot connection between the platform (22) and the mast (21), connecting the two (22)(21). This is the main pivot connection, allowing the platform (22) to move up and down with little or no side movement.

The second pivot connection is the height adjuster platform connector (32), which is a pivot connection between the height adjuster (20) and the bottom of the platform (22). The height adjuster platform connector (32) allows the platform (22) up and down. The height adjuster platform connector (32) also allows the platform (22) to swing down to the storage position when disconnected. The third pivot connection is the platform pivot plates (33), which connect the chest section (29) and the body section (28), and will be discussed in further detail below.

There is preferably a chest pad support brace (36) attached to a chest section (29). There are also preferably three body pad support braces (38), (39), and (40) attached to the body section arm (43). A center mount hole (44) provides a mounting point for the chest pad (31). Double braces could be used to increase stability. In an alternative embodiment, four or more braces are used to support the body pad.

In a preferred embodiment, all of the support braces (36), (38), (39), and (40) are made out of 1½" wide angle iron. The chest pad support brace (36) is located 12" from the front of the chest section (29). The chest pad support brace (36) extends out 3½" on either side of a 2½"×2½"×16" chest section (29). The body section arm (28) is 2½"×2½"×28¾" long. Body pad support braces (38), (39), and (40) extend out 3½" on either side of the body section arm (28). The body pad support brace (38) is 10⅛" from body pad support brace (39). The body pad support brace (39) is 9¼" from body pad support brace (40). The body pad support brace (38) is also 3¾" from the mast platform connector (24). There is 16¼" between the mast platform connector (24) and the height adjuster connector (32).

Figure 8A:
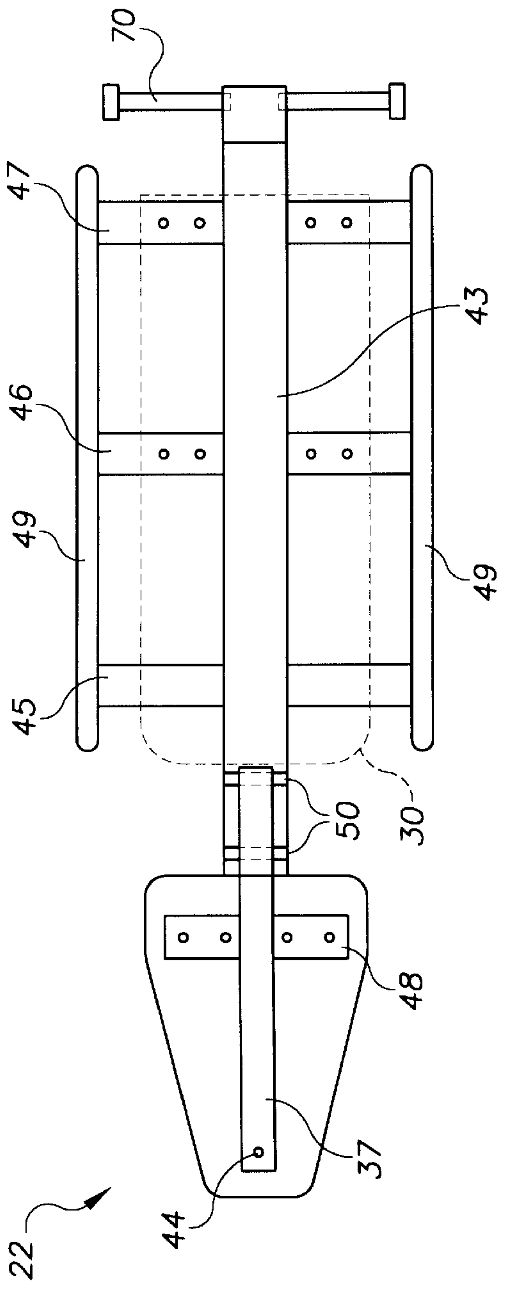
FIG. 8A shows a top view of the platform without the chest and body pads in an alternative embodiment of the invention.
Figure 8B:
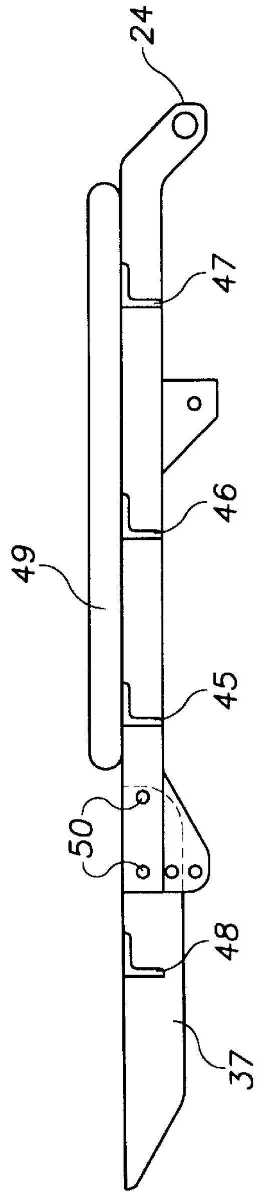
FIG. 8B shows a side view of the platform as shown in FIG. 8A.

Referring also to FIGS. 8A and 8B, in an alternative embodiment, the platform (22) has three body pad support braces (45), (46), and (47) and a chest pad support brace (48). Each of the support braces (45), (46), (47), and (48) are preferably made of 2" angle iron. 9" separate each of the body pad support braces (45), (46), and (47). The body pad support brace (47) is separated from the mast-platform pivot point by 10". Adjustable pins (50) provide the pivot connection between the chest section (29) and the body section (28). ⅞" NC bolts (70) hold the platform (22) to the mast (21). These figures also show raised hand rails (49) perpendicularly attached to the body pad support braces (45), (46), and (47). These hand rails (49) are preferably 1" wide, 28" inches long, and are made of ¾" pipe. The hand rails (49) are preferably mounted 1" above the pad section. The hand rails (49) could also be incorporated into the embodiment shown in FIGS. 6 and 7. The hand rails (49) preferably run the full length of the body section arm (43) and are on both sides to add safety and security for the user on the platform (22).

Figure 9A:
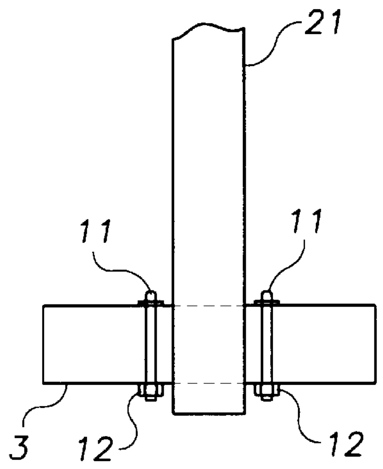
FIG. 9A shows a back view of how the u-bolt mounting plate clamps to the main mast section.
Figure 9B:
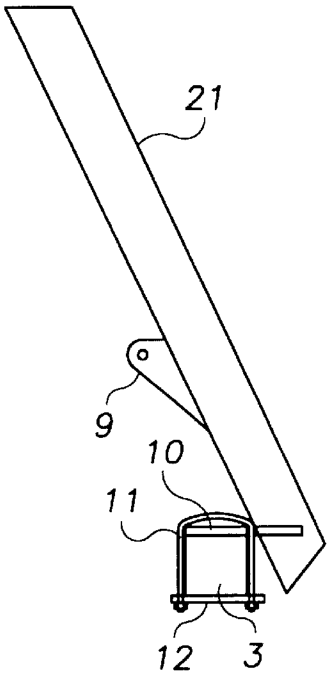
FIG. 9B shows a side view of FIG. 9A.
Figure 9C:
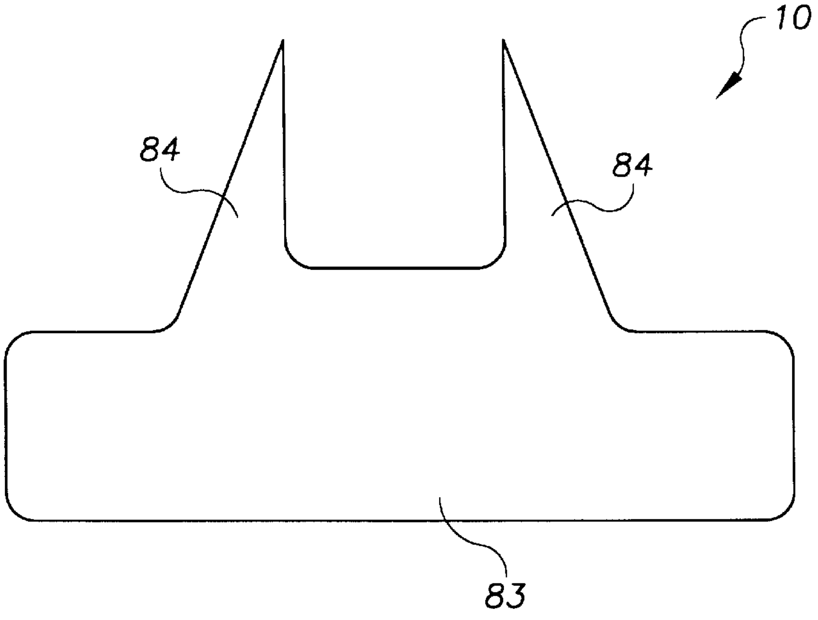
FIG. 9C shows a top view of the u-bolt mounting plate before welding. This plate mounts to the base unit with the u-bolt as seen in FIGS. 9A and 9B.
Figure 9D:
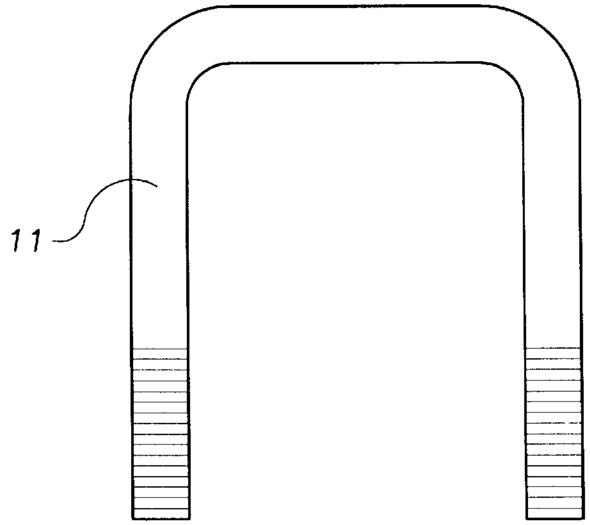
FIG. 9D shows a close up view of a u-bolt used in an embodiment of the invention.
Figure 9E:
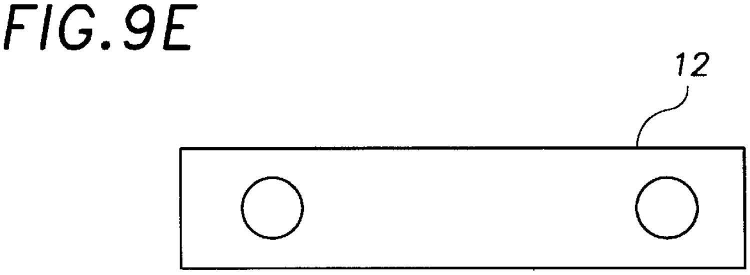
FIG. 9E shows a close up view of the clamp strap, which the u-bolt fits into in an embodiment of the invention.

Referring also to FIGS. 9A through 9C, a two u-bolt clamp system is used in the preferred embodiment. The two u-bolts (11) clamp down the u-bolt mast plate (10) (also shown in FIG. 2) to the back support (3). The u-bolt clamp plate (10) is welded to the mast (21) 5" up from the bottom of the mast (21) and is 5½" below the center hole of the arm mount (9) on the mast (21). The main portion (83) of the u-bolt clamp plate (10) is preferably 10¼" long×2½: wide. Each of its projections (84), which fit around the mast (21) is preferably 2½" long. These two projections (84) create an opening of approximately 2$^{13}/_{16}$" into which the mast (21) fits. The distance between the projections (84) and the ends of the main portion (84) of the u-bolt clamp plate (10) is preferably approximately 2" on either side. There is preferably a second set of two u-bolts (11) that clamp vertical arm support (25) to the center of middle support (4) of the base (2) and this allows the horizontal support arm (26) to be bolted into the arm mount (9) on the mast (21). All four u-bolts (11) preferably are ½" diameter by 4" long by 3" inside dimensions. For each u-bolt (11), a clamp strap (12) (see FIGS. 9D and 9E) mounts under the back support (3) and the middle support (4). This allows the u-bolts (11) to tighten up and clamp the mast (21) to the back support (3) and the vertical arm support (25) to the center of the middle support (4). The clamp straps (12) are preferably $^{3}/_{16}$" thick×1½" wide×4½" long.

Figure 10:
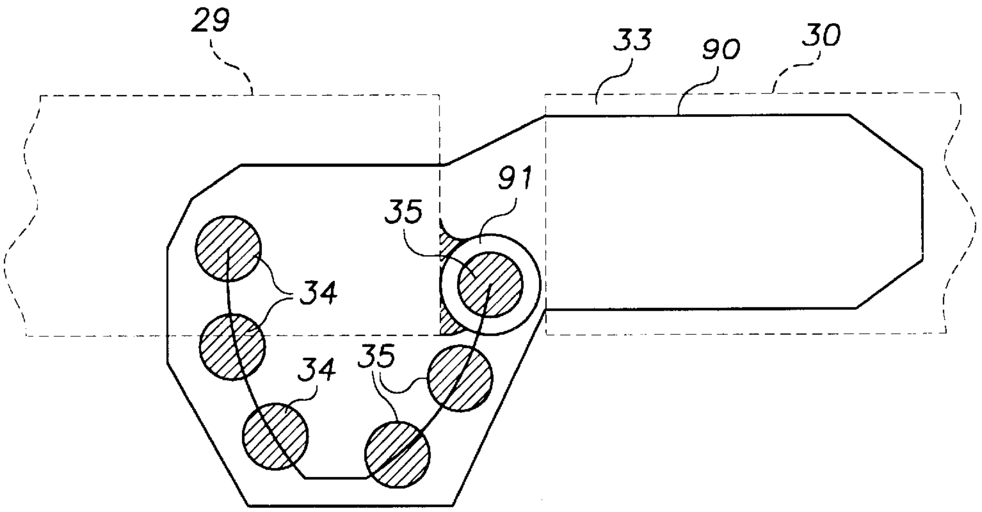
FIG. 10 shows the design of the pivot plates that are welded to the body section, which allows the chest pad to adjust to five different positions.

Referring also to FIG. 10, there are preferably two pivot plates (33) attaching the body section (30) to the chest section (29), one on either side of the platform (12). The back piece (90) of each pivot plate (33) is welded to the side of the body section (30). The back piece is preferably 2" wide at the end closes to the front end of the body section (30) and 1" wide at the end closest to the back of the body section (30). There is preferably 4" between the front end of the body section (30) and the back end of the back piece (33). A circular pipe (91) is welded to the back of the chest section (29). The circular pipe (91) is preferably 2½" wide. The circular pipe (91) has a hole (35) in which a lock pin fits. There are two additional holes (35) which change the height of the chest section (29). Each lower hole (35) adjusts the chest section (29) proportionately up. There is also an additional set of three holes (34) in which an adjustable pin fits. When the adjustable pin is in the top hole (34) and the lock pin is in the top hole (35), the chest section (29) is in a level, flat position. When the adjustable pin is in either of the lower holes (34), the chest section is adjusted proportionately downward. Each hole is preferably ⅝" in diameter. There are preferably 4" between the front of the body section (30) and the front of the pivot plate (33). The total length of the pivot plate (33), including the back piece (90) is preferably 8".

Figure 12:
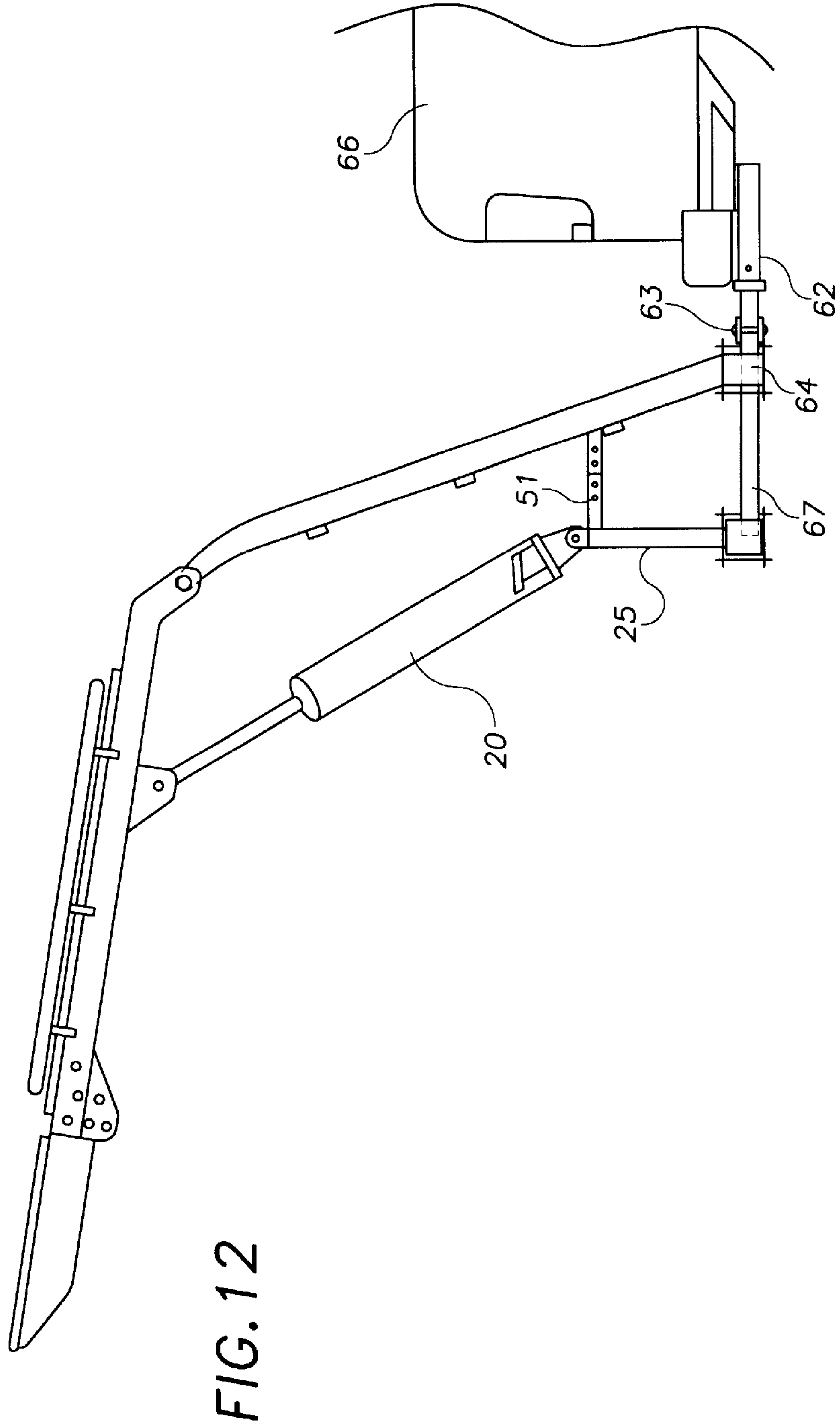
FIG. 12 shows a side view of an alternative embodiment of the creeper with a trailer hitch mount.
Figure 13:
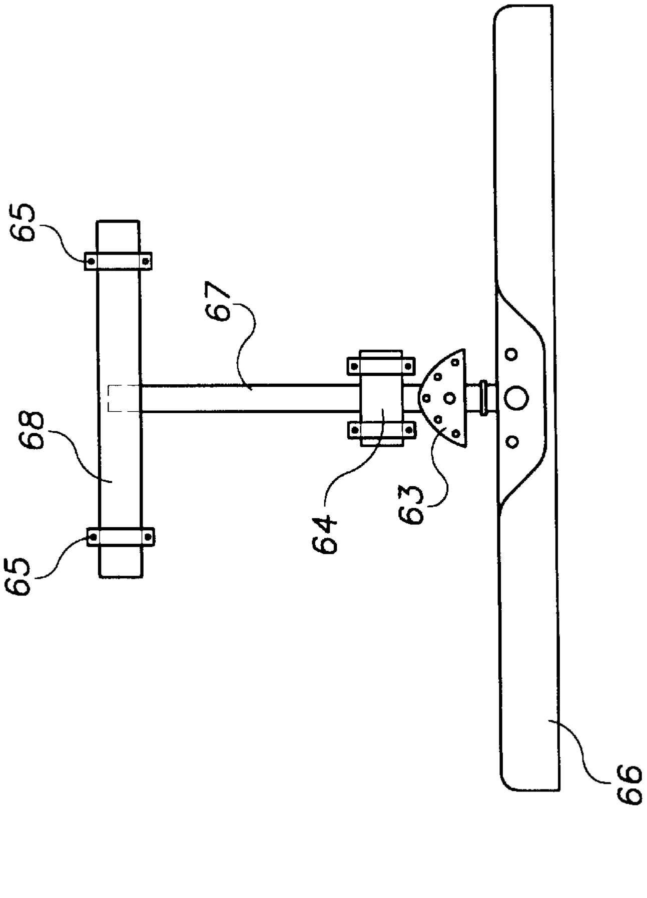
FIG. 13 shows a top view of the creeper in FIG. 12.

Referring now to FIGS. 12 and 13, the base (2) is replaced by a trailer hitch (62). A swivel mount (63) allows a range of movement of the creeper behind the vehicle (66). A mast support mount (64) is located at the base of the mast (21). An arm (67) connects the mast support mount (64) to the base (68) of the vertical support arm (25).

Figure 14:
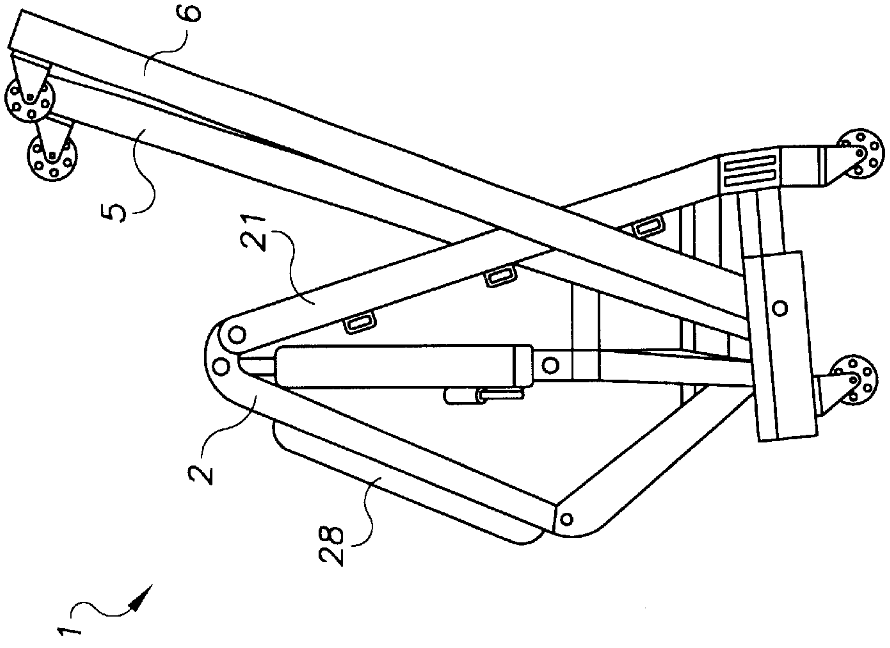
FIG. 14 shows the creeper folded up for storage in a preferred embodiment of the invention.

Referring now to FIG. 14, the creeper (1) is easily folded up for storage. Leg members (5) and (6) fold up, while body section (28) and chest section (29) fold down. The creeper (1) is now in a compact, easy to store configuration.

Figure 15:
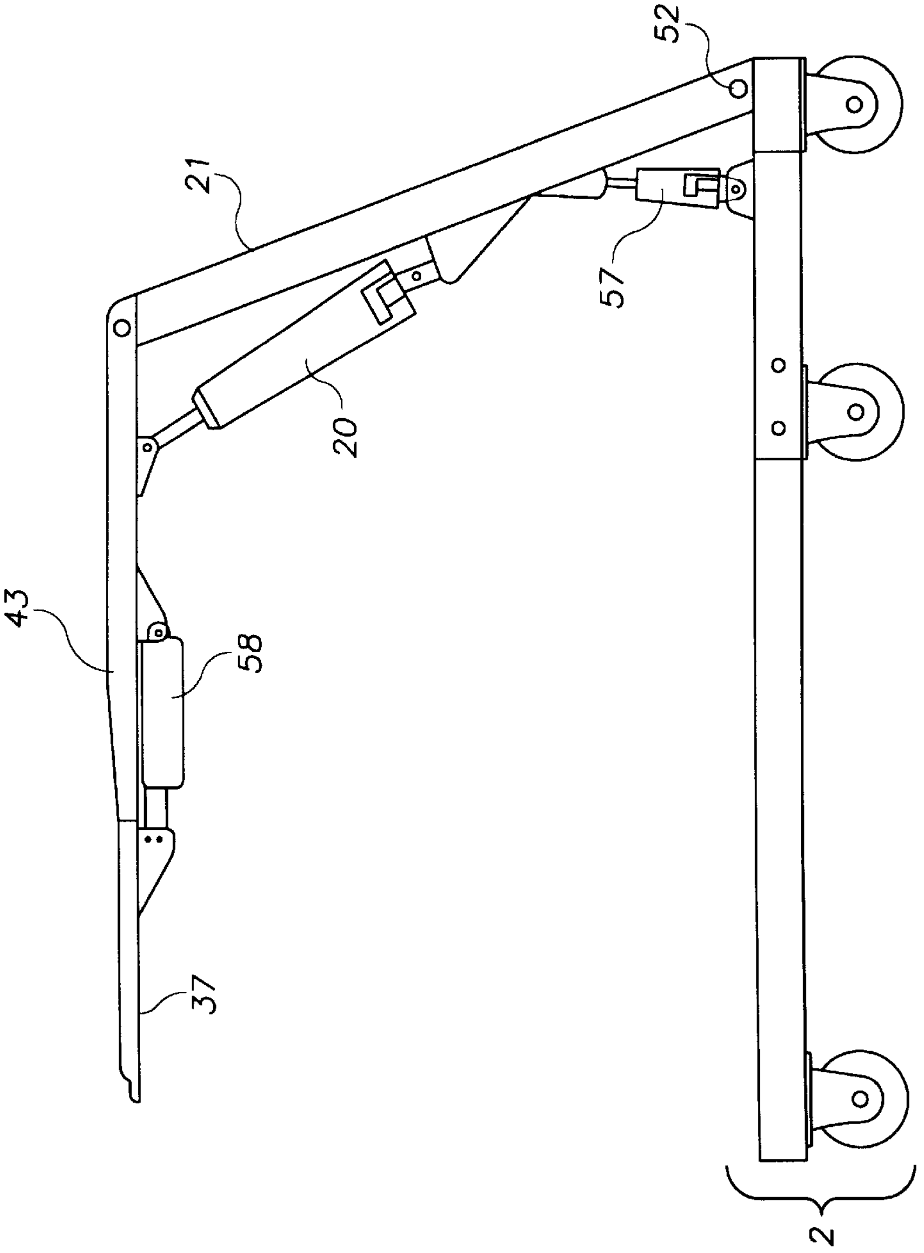
FIG. 15 shows a creeper with three hydraulic cylinders in an alternative embodiment of the present invention.

Referring also to FIG. 15, in an alternative embodiment, the vertical arm support (25) is replaced with an additional height adjuster (57) to support the mast (21). The height adjuster (57) is preferably a hydraulic cylinder. The height adjuster (57) also allows the mast (21) to be adjustable. A mast base connector (52), a pivot connection between the mast (21) and base (2), connects the mast (21) and the base (2) to allow movement of the mast (21). Since there is no longer a vertical arm support (25), the height adjuster (20) is now directly attached to the mast (21). A third height adjuster (58) connects the chest section arm (37) and the body section arm (43). The height adjuster (58) is preferably a hydraulic cylinder. The height adjuster (58) provides movement of the chest section arm (37).

Figure 16:
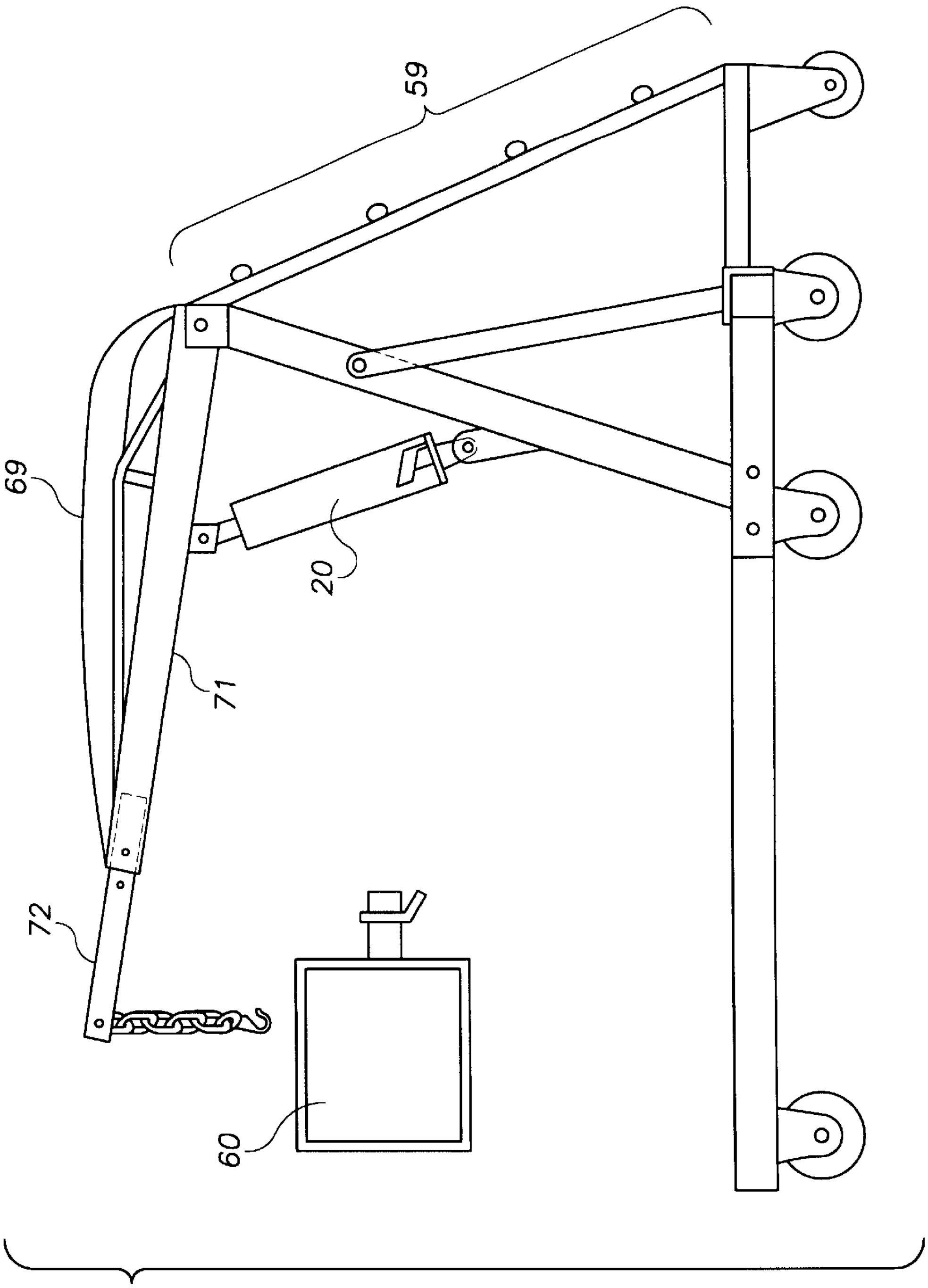
FIG. 16 shows a side view of an alternative embodiment of the invention with an add-on tool tray and ladder section.

Referring also to FIG. 16, an add-on ladder section (59) is preferably added to an engine hoist in an alternative embodiment. The ladder section (59) is clamped over the original base (2) and extends the base (2). The ladder section (59) allows a user to mount the platform easily and safely. FIG. 16 also shows a creeper pad (60) covering the elevated crane portion (71) of the engine hoist. The elevated arm (72) of the engine hoist can be removed and replaced by an add-on tool tray (60). The tool tray (60) makes it convenient for a user such as a mechanic to work on an airplane or other vehicle with his tools in easy reach.

Figure 11:
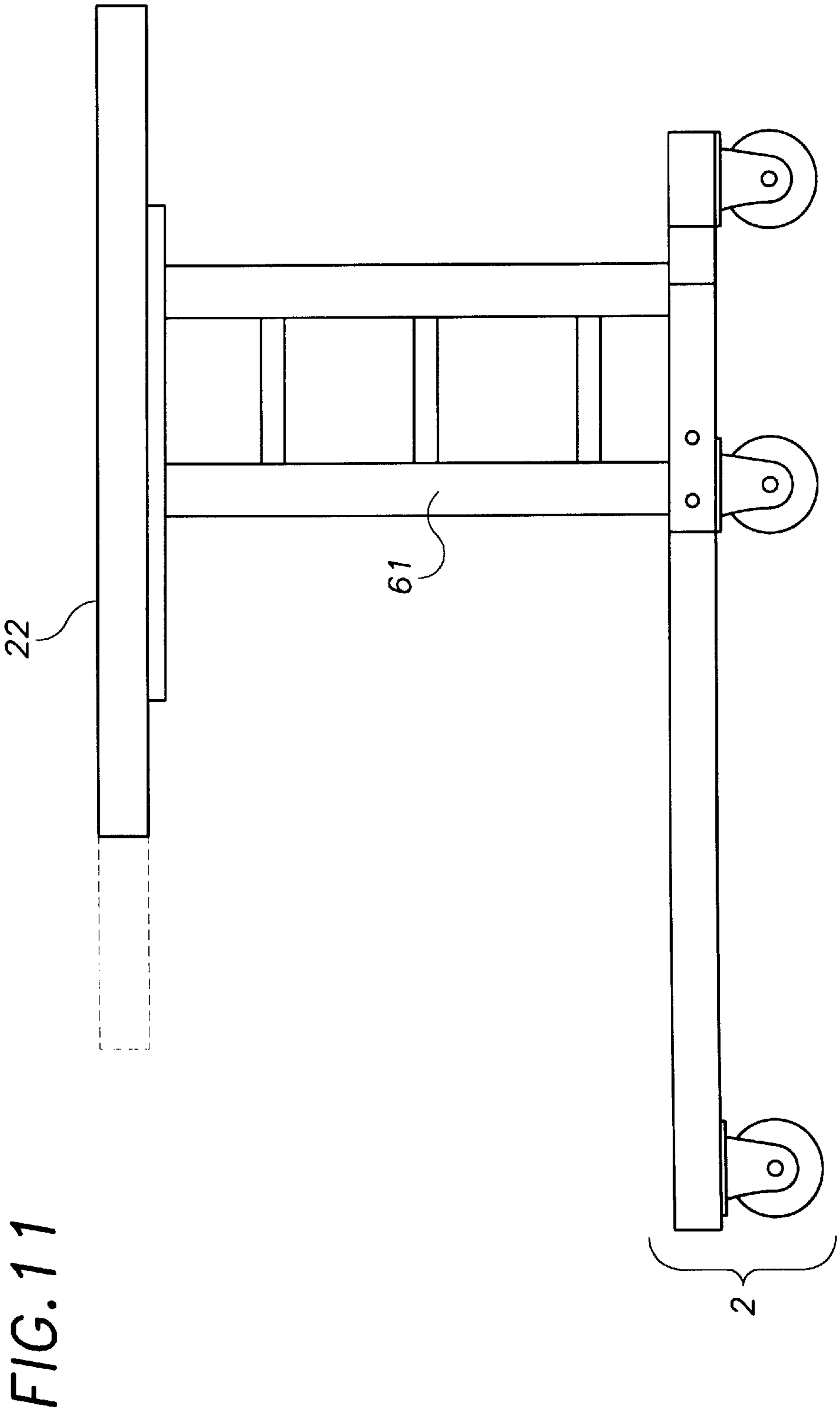
FIG. 11 shows a side view of an alternative embodiment of the creeper with a ladder.

Alternatively, a ladder (61) is mounted on the side of the creeper as shown in FIG. 11. In this embodiment, the platform (22) preferably has rollers within it to allow the padded sections to slide forward approximately two feet. The back of the platform (22) also has a roller stop to keep it from sliding out too far. The base (2) is wider in the back than the base (2) described above so that the ladder (61) can be safely mounted from the side.

Figure 19A:
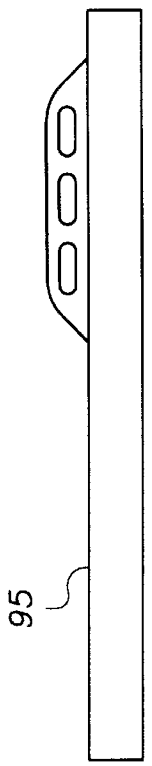
FIG. 19A shows a side view of the base shown in FIG. 18.
Figure 19B:
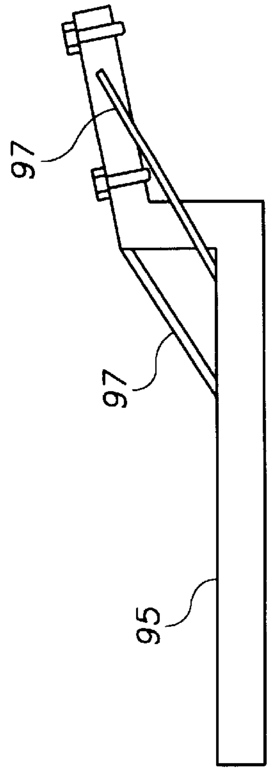
FIG. 19B shows a top view of one of the sides of the base shown in FIG. 18.
Figure 18:
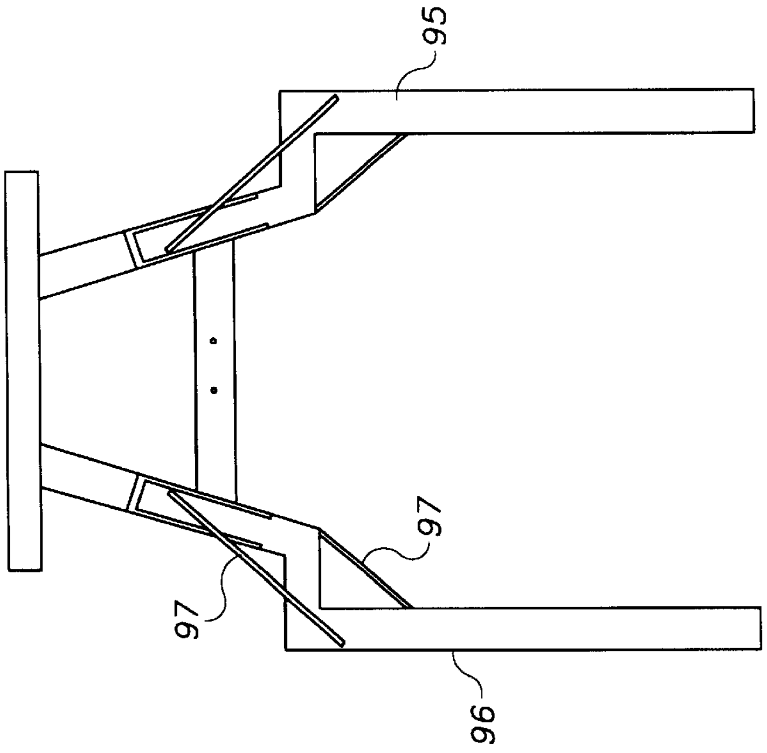
FIG. 18 shows a top view of the base of the creeper in an alternative embodiment of the invention.

Referring also to FIGS. 18, 19A, and 19B in an alternative embodiment, the base is constructed so that the leg members (95) and (96) can fit around an obstacle, for example a truck tire. Support arms (97) stabilize the base. The leg members (95) and (96) straddle the tire. This allows the creeper (1) to be used on the side of the vehicle, instead of directly in the front or back of the vehicle. In this embodiment, the distance between the two leg members (95) and (96) is preferably approximately 40". However, this distance may be adjusted according to the obstacle the creeper is trying to go around.

Figure 20:
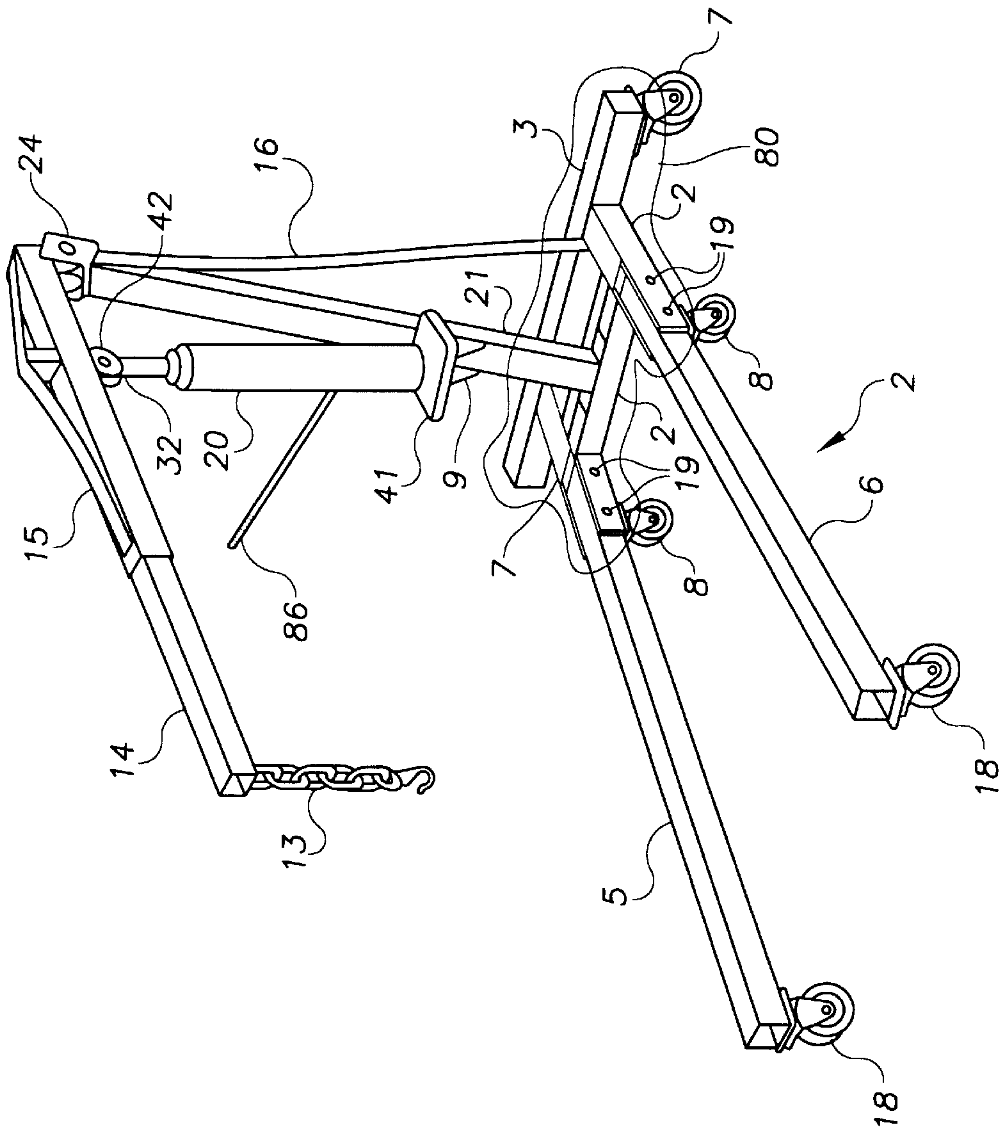
FIG.20 PRIOR ART
FIG. 20 shows an engine hoist, as known in the prior art.

In a preferred embodiment, an engine hoist as shown in FIG. 20 is converted into the creeper of the present invention. An example of some of the main steps in the process of the conversion are:

I. Assemble the engine hoist per the instructions for assembly of the engine hoist. At this point, the engine hoist can be converted to the creeper (1) of the present invention.

II. Disconnect the engine hoist boom (15) from height adjuster (20) at a pivot connection (32) between the height adjuster (20) and the engine hoist boom (15) by removing pivot pin (42).

1. Detach the engine hoist boom (15) from the mast (21) at pivot connection (24) between the engine hoist boom (15) and the mast (21) and set it aside.
2. Remove the pivot pin (41) from a horizontal arm mount (9) that was on the original jack mount (which later becomes the horizontal arm mount) and remove height adjuster (20). Disconnect jack handle (86) from the height adjuster (20).
3. Remove engine hoist mast stabilizers (16) and set aside.
4. Disconnect mast (21) from the base (2).
5. Add the improvements described above.
6. Reattach the mast (21) to the center of back support (3) with two u-bolts (11) over the top of the mast u-bolt plate (10).
7. Install the vertical arm support (25) and horizontal support arm (26) by connecting them to the mast (21) using the arm mount (9).
8. Set the vertical arm support (25) on top of the center of the middle support (4) and install two u-bolts (11).
9. Align both the vertical arm support (25) and the mast (21) to the base (2), then tighten all four u-bolts (11).
10. Reinstall the height adjuster (20) by connecting it to the vertical arm support (25) at the vertical arm support pivot connection (27).
11. Install the complete platform (22), including the chest section (29) and the body section (30).
12. Attach the height adjuster (20) to the platform (22) at the pivot connection between the platform and the height adjuster (32). Conversion is now complete, and the creeper is ready to use.

The present invention is an improvement over the prior art because it provides infinite adjustability throughout the range of motion. The creeper also preferably has a two piece adjustable platform with five positions. The invention is compatible with other existing shop equipment making it easy to manufacture and less expensive to buy. The creeper also folds up for easy storage.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An elevated platform creeper comprising:

a) a base formed by a plurality of leg members connected to each other by a back support and a middle support;

b) a mast having a top and a bottom end where said bottom end is connected to said base;

c) a platform connected to said mast, wherein said platform has:

i) a body section including a front and a back end;

ii) a chest section including a front and a back end; and iii) a pivot connection between said front end of said body section and said back end of said chest section, wherein said pivot connection allows said chest section to pivot with respect to said body section and can be secured in a fixed position; and d) a height adjuster having a top and a bottom end, wherein said top end is connected to said platform and said bottom end is connected to said base.

2. The elevated platform creeper of claim 1, wherein said plurality of leg members are further connected to a plurality of wheels.

3. The elevated platform creeper of claim 1, wherein said mast has a plurality of steps that are fixedly attached.

4. The elevated platform creeper of claim 1, wherein said height adjuster is selected from the group consisting of:

a) a hydraulic cylinder;

b) a trailer tongue screw type jack;

c) a screw type adjustable link; and d) a steel cable on a hand crank system.

5. The elevated platform creeper of claim 1, wherein said body section comprises:

a) a body section arm;

b) a plurality of body section support braces connected to a bottom of said body section arm such that said braces extend perpendicularly on both sides of said body section arm; and c) a body section pad placed over said body section arm.

6. The elevated platform creeper of claim 1, wherein said chest section comprises:

a) a chest section arm;

b) at least one chest section support brace connected to a bottom of said chest section arm such that said brace extends perpendicularly on both sides of said chest section arm to support said chest section arm; and c) a chest pad placed flat over said chest section arm.

7. The elevated platform creeper of claim 1, further comprising a brake that prevents movement of the base.

8. The elevated platform creeper of claim 1, further comprising a trailer hitch for an automobile and a swivel mount.

9. The elevated platform creeper of claim 1, further comprising a tool tray.

10. The elevated platform creeper of claim 1, further comprising hand rails.

11. A conversion kit for converting an engine hoist into an elevated platform creeper, wherein said engine hoist has an engine hoist boom, a height adjuster, a mast, and a base with legs connected by a middle support and a back support, said kit comprising:

a) a mast connector shaped in a similar profile to said back support such that fasteners can be used to connect said mast to said mast connector;

b) a platform having:

i) a body section including a front and a back end;

ii) a chest section including a front and a back end; and iii) a pivoting connection between said front end of said body section and said back end of said chest section, wherein said pivoting connection allows said chest section to pivot with respect to said body section and can be secured in a fixed position;

c) a platform connector that attaches said mast to said back end of said body section of said platform in a pivoting connection that can be secured in a fixed position; and d) a height adjuster connector shaped in a similar profile to a middle support of said base such that fasteners can be used to connect said height adjuster to said base.

12. The kit of claim 11, further comprising a plurality of steps that can be fixedly attached to said mast.

13. The kit of claim 11, wherein said body section comprises:

a) a body section arm;

b) a plurality of body section support braces connected to a bottom of said body section arm such that said braces extend perpendicularly on both sides of said body section arm, wherein said braces support said body section arm; and c) a body section pad placed flat over said body section arm.

14. The kit of claim 11, wherein said chest section comprises:

a) a chest section arm;

b) at least one chest section support brace connected to a bottom of said chest section arm such that said brace extends perpendicularly on both sides of said chest section arm to support said chest section arm; and c) a chest pad placed flat over said chest section arm.

15. The kit of claim 11, further comprising a brake that prevents movement of the base.

16. The kit of claim 11, further comprising a trailer hitch for an automobile and a swivel mount.

17. The kit of claim 11, further comprising a tool tray.

18. The kit of claim 11, further comprising hand rails.

19. A method for converting an engine hoist into an elevated platform creeper, wherein said engine hoist has an engine hoist boom, a height adjuster, a mast, and a base with legs connected by a middle support and a back support, said method comprising:

a) disconnecting said engine hoist boom from said height adjuster, said engine hoist boom from said mast, said height adjuster from said base; and said mast from said base;

b) reattaching said mast to said back support of said base in a direction opposite to its normal position when assembled as an engine hoist and reattaching said height adjuster to said middle support of said base; and c) installing a platform to said mast and said height adjuster by pivoting connections, wherein said platform comprises a chest pad section, a body section, and a pivot connection between said body section and said chest section wherein said pivot connection allows said chest section to pivot with respect to said body section and can be secured in a fixed position.

* * * * *